(12) United States Patent
Cattani

(10) Patent No.: US 9,586,689 B2
(45) Date of Patent: Mar. 7, 2017

(54) PARACHUTE DEVICE

(71) Applicant: Enrico Cattani, La Spezia (IT)

(72) Inventor: Enrico Cattani, La Spezia (IT)

(*) Notice: Subject to any disclaimer, the term of this patent is extended or adjusted under 35 U.S.C. 154(b) by 88 days.

(21) Appl. No.: 14/414,002

(22) PCT Filed: Jul. 12, 2013

(86) PCT No.: PCT/IB2013/055768
§ 371 (c)(1),
(2) Date: Jan. 9, 2015

(87) PCT Pub. No.: WO2014/009931
PCT Pub. Date: Jan. 16, 2014

(65) Prior Publication Data
US 2015/0210401 A1    Jul. 30, 2015

(30) Foreign Application Priority Data
Jul. 13, 2012    (IT) .............................. TO2012A0624

(51) Int. Cl.
| B64D 25/10 | (2006.01) |
| B64D 17/78 | (2006.01) |
| B64C 31/036 | (2006.01) |
| B64C 39/02 | (2006.01) |
| B64D 17/34 | (2006.01) |
| B64D 17/40 | (2006.01) |
| B64D 17/52 | (2006.01) |
| B64C 27/52 | (2006.01) |

(52) U.S. Cl.
CPC ............ *B64D 17/78* (2013.01); *B64C 31/036* (2013.01); *B64C 39/026* (2013.01); *B64D 17/34* (2013.01); *B64D 17/40* (2013.01); *B64D 17/52* (2013.01); *B64D 25/10* (2013.01); *B64C 27/52* (2013.01)

(58) Field of Classification Search
CPC ........ B64D 19/00; B64D 17/78; B64D 17/62; B64D 17/68; B64D 17/00; B64C 31/036; B64C 39/026; B64C 27/52
USPC ........................................................ 244/141
See application file for complete search history.

(56) References Cited

U.S. PATENT DOCUMENTS 1,867,759 A * 7/1932 Rehbock ................. B64C 27/08
                                                    244/64
5,620,153 A * 4/1997 Ginsberg .............. B64C 31/036
                                                    244/13
(Continued)

FOREIGN PATENT DOCUMENTS

DE    2628274 A1 * 1/1978 ........... B64C 39/026
DE    3920945        1/1991
(Continued)

OTHER PUBLICATIONS

International Search Report and Written Opinion from International Application No. PCT/IB2013/055768 mailed Oct. 9, 2013.

*Primary Examiner* — Medhat Badawi
*Assistant Examiner* — James Atwell
(74) *Attorney, Agent, or Firm* — Dorsey & Whitney LLP

(57) ABSTRACT

A parachute device is provided with a bag containing a main parachute and a reserve parachute and with a propulsion assembly having a frame to which two arms are coupled; the two arms can be opened laterally by operating a control and support respective power units, which can be started by operating a further control.

10 Claims, 2 Drawing Sheets

(56) References Cited

U.S. PATENT DOCUMENTS

| | | | | |
|---|---|---|---|---|
| 8,608,112 B1 * | 12/2013 | Levay | ............... | B64D 17/343 |
| | | | | 244/149 |
| 2013/0200218 A1 * | 8/2013 | Suh | ..................... | B64D 17/72 |
| | | | | 244/146 |

FOREIGN PATENT DOCUMENTS

| | | | | |
|---|---|---|---|---|
| DE | 102010028502 A1 * | 11/2011 | ........ | B64C 31/036 |
| FR | 2655017 | 5/1991 | | |
| WO | WO 03/004354 | 1/2003 | | |
| WO | WO 2010/133471 | 11/2010 | | |

\* cited by examiner

PARACHUTE DEVICE

TECHNICAL FIELD

The present invention relates to a parachute device.

BACKGROUND ART

As known, parachute devices are defined by bags which contain a main parachute and a reserve parachute and are worn by way of an appropriate harness for jumping from the aircraft, for military purposes, as a sport, or in emergency situations.

After jumping from the aircraft and the opening of the main parachute, it is usually possible to manoeuvre the main parachute canopy to determine an approximate direction of the path to the ground during the descent. The need is felt for increasing the gliding distance of the parachutist during the descent from the jump point, without interfering with jumping operations from the aircraft and the opening of the parachute, for example in order to land on a safer area and, more in general, to increase the parachutist operational capacity.

In the prior art, to fly at distances relatively high, is known to use motor para-gliders, also called para-motors, having a structure which supports one or two motorized screw propellers. Said structure hinders the jump attempt from aircraft, therefore the known para-motors are unsatisfactory.

DISCLOSURE OF INVENTION

The aim of the present invention is to provide a parachute device, which allows to satisfy in a simple and economic way the need described above.

According to the present invention a parachute device, as defined in claim 1 is provided.

BRIEF DESCRIPTION OF THE DRAWINGS

For a better understanding of the present invention a preferred embodiment is now described, purely by way of non-limiting example, with reference to the accompanying drawings, wherein.

BEST MODE FOR CARRYING OUT THE INVENTION

In the attached figures, the reference number 1 indicates, as a whole, a parachute device comprising a harness 3 (indicated in a simplified manner and in dashed lines in FIG. 3) adapted to be worn by a parachutist 4 (shown schematically). The harness 3 may be of single type, that is wearable by a single user, or of a tandem type, that is wearable by two users arranged one behind the other, for instance during training.

Figure 1:
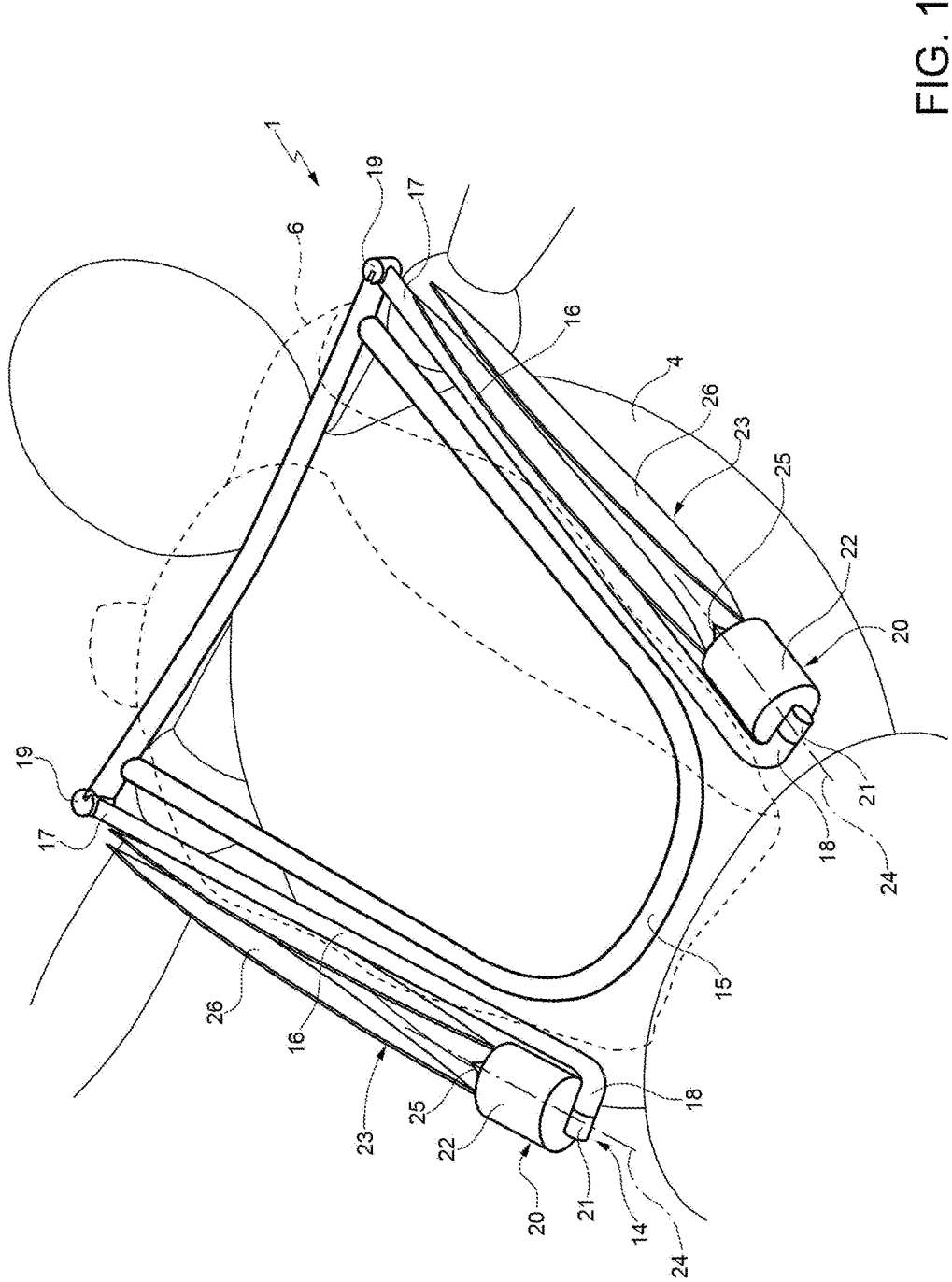
FIG. 1 is a partial and schematic rear view of a preferred embodiment of the parachute device according to the present invention.

The parachute device 1 further comprises a bag 6 (shown in dashed lines in FIG. 1 and in solid line in FIG. 2) connected to the harness 3 in known manner not described in detail. The bag 6, when closed, contains a main parachute and a reserve parachute. The bag 6 can be opened by operating a control member 7 (shown schematically in FIG. 3) to open the parachute.

Figure 2:
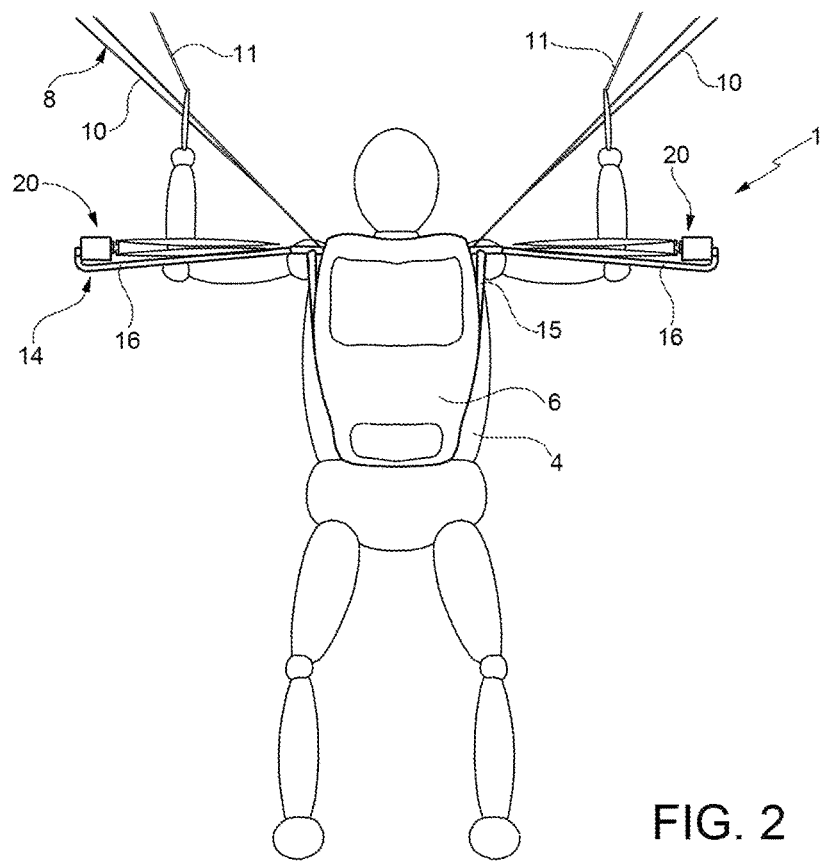
FIGS. 2 and 3 are a rear view and, respectively, a three-quarter front view which show the parachute device of FIG. 1 in two different instants during a descent with an open parachute.
Figure 3:
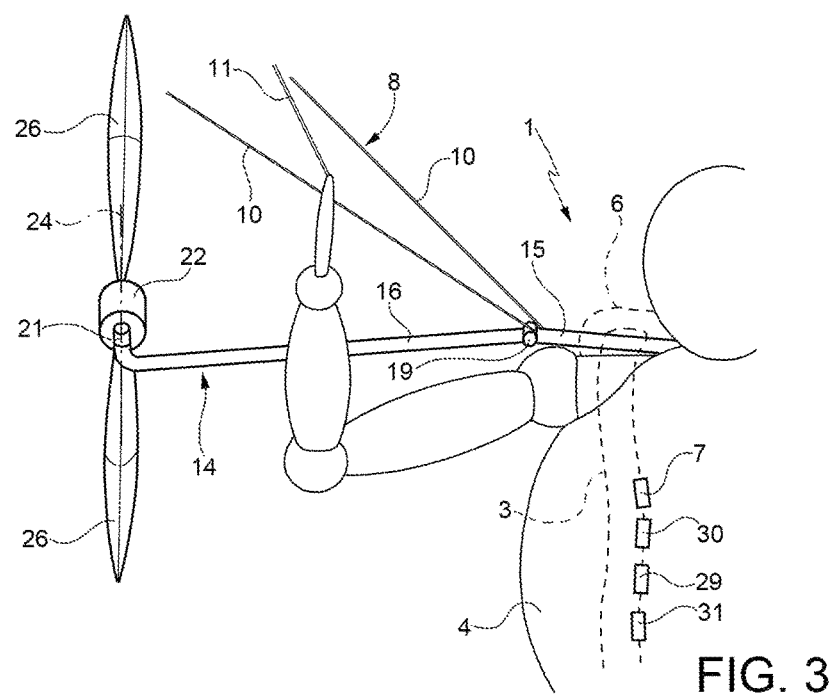

FIGS. 2 and 3 show one of the two parachutes, indicated by reference number 8 and fully opened. The parachute 8 comprises a canopy not visible in the figures, a plurality of support cables 10 that connect the canopy to the bag 6 and control cables 11 to allow the parachutist 4 to manoeuvre the canopy during the descent.

The parachute device 1 further comprises an assembly 14 for auxiliary propulsion, which, in turn, comprises a frame 15 connected in fixed position to the bag 6 and/or the harness 3. Preferably, at least a part of the frame 15 extends inside the bag 6.

The assembly 14 further comprises at least two arms 16, which are arranged on opposite sides of the frame 15 and are supported by the frame 15 itself. In particular, each arm 16 has two opposite ends 17 and 18, of which the end 17 is connected to the frame 15 by means of a joint 19; and the end 18 is coupled to a respective power unit 20, preferably by way of a joint 21.

Preferably, each power unit 20 comprises an electric motor 22 and a screw propeller 23, which is coaxial to the motor 22 along an axis 24 and comprises a hub 25 driven by the motor 22 and at least two blades 26. The motor 22 is powered by a battery pack not shown, which is contained in the bag 6 and/or supported by the frame 15 or coupled to the front part of the harness 3.

According to the invention, the assembly 14 can be configured between a rest or inactive condition (FIG. 1), wherein the arms 16 are folded downwardly so as to extend in a substantially vertical direction to the side of the bag 6, and an operating condition (FIG. 3), wherein the arms 16 are opened so as to protrude laterally outwardly with respect to the frame 15.

At the same time, the axes 24, in the rest condition, are substantially parallel to respective arms 16 and, in the operating condition, are horizontal and parallel to each other so as to define the directions of thrust of the power units 20.

Also, preferably the blades 26 are coupled to respective hubs 25 by way of joints not shown, for which in the rest condition are folded so as to be substantially parallel to the axes 24 and, in the operating condition, are open in a radial pattern. According to a variant not illustrated, the device 1 comprises a protection element carried by the frame 15 in a position so as to protect the screw propellers 23 when the blades 26 are folded.

According to further variations not shown, the arms 16 are replaced by structures, such as articulated parallelograms, bound to the frame 15 so as to have a greater rigidity.

In addition, the arms or structures 16 may be of a collapsible or compressible type. For example, they could be of the folding type, around one intermediate joint and/or telescopic.

Preferably, the assembly 14 comprises a locking device not shown, which keeps the components of the assembly 14 in the rest position and is of releasable type; a control member 29 (shown schematically) can be operated by the parachutist 4 to release the locking device and configure the assembly 14 in the operating position. For example, elastic elements and/or transmission elements and/or actuators (not shown) are provided to unfold the assembly 14 towards the operating position in response to the operation of the control member 29.

The assembly 14 further comprises a control member 30 (schematically illustrated), that can be operated by the parachutist 4 to start/stop the power units 20. If necessary, a system operable by the parachutist 4 could also be envisaged for checking and adjusting the power thrust of the power units 20.

Advantageously, the joints 19 define a releasable coupling: a control member 31 (shown schematically) can be operated by the parachutist 4 to release the coupling of the joints 19 and therefore drop the arms 16 from the frame 15, in order to drop automatically the arms 16 with power units 20 and thus lighten the parachute device 1 in case of need. A similar system of releasable coupling and of release can be provided for the battery pack that powers the motors 22.

Similarly, the assembly 14 may be joined to the bag 6 by way of a coupling system of a releasable type, in order to be assembled and disassembled, and then being able to change the type of parachute with immediacy.

The operation of the assembly 14 is evident from the above characteristics: after jumping and the opening of the parachute 8, the parachutist 4 has the ability to operate the control member 29: in response to said operation, first automatically the arms 16 open, rotating around the joints 19 (FIG. 2); in addition, the power units 20 automatically rotate around the joints 21 to orient the axes 24; and, finally, the blades 26 are automatically opened in a radial pattern (FIG. 3). At this point, it is possible to operate the control member 30 to start the motors 22.

From the foregoing it is evident that the assembly 14 is configurable to allow the parachutist 4, on the one hand, to launch from an aircraft and, secondly, to extend the path before landing.

Indeed, the assembly 14, in the rest condition, does not hinder the opening of the bag 6 and the unfolding of the parachute during descent, as the arms 16 occupy a position next to the frame 15 and to the bag 6. At the same time, the assembly 14 can be activated by way of the control member 29 to open the arms 16 and the power units 20 and by way of the control member 30 to start the power units 20 themselves, so as to have an auxiliary thrust during the descent after the opening of the parachute 8.

In the operating position, the open position of the arms 16 and the power units 20 does not hinder the control cables 11, so it is always possible to manoeuvre the canopy of the parachute 8.

Meanwhile, the use of at least two power units 20 in positions symmetrical with respect to an ideal centerline vertical plane allows to avoid reaction torques on the frame 15.

Furthermore, it is always possible to release the arms 16 and/or the battery pack to lighten the device 1 in case of emergency.

Finally it is clear that the device 1 described and illustrated here can be modified and varied without departing from the protective scope of the present invention, as defined in the appended claims.

In particular, the parachute device 1 can also be used for a departure from the ground, as known para-motors, with the assembly 14 already configured in the operating condition, for example, to start from a plane zone after landing.

The assembly 14 can be activated by way of a remote control unit, operating by way of the transmission of wireless signals, via radio and/or satellite, so as to use the device 1 as autonomous aircraft, i.e. without parachutist, for example to airdrop an inert load from a traveling aircraft. In this case, the harness 3 could be replaced by suitable fastening systems for securing the load to the bag 6 and/or to the frame 15.

Furthermore, the power units 20 may be of a different type, for example, comprising small internal combustion engines or turbine engines.

Finally, the arms 16 may be placed on the front of the body of the parachutist or laterally, and/or the device 1 can be installed on ejection seats.

The invention claimed is:

1. A parachute device, comprising:
    a bag containing a main parachute and a reserve parachute;
    an attachment device for coupling the bag to at least one of a load or a parachutist;
    a first control device operable to open at least one of the main parachute or the reserve parachute; and
    a propulsion assembly including:
        a frame coupled to at least one of the bag or the attachment device;
        at least two arms supported by the frame and arranged on opposite sides of the frame;
        at least two power units supported respectively by the at least two arms and defining respective axes of thrust;
        a second control device operable to bring the propulsion assembly from a rest condition in which the at least two arms are folded about first rotation axes with respect to the frame and are arranged adjacent to at least one of the frame or the bag, to an operating condition in which the at least two arms laterally extend in a cantilever manner from the frame;
        a third control device operable to start the at least two power units;
        wherein, in the rest condition, the axes of thrust are substantially parallel to the at least two arms; and
        wherein, in the operating condition, the axes of thrust are transverse to the at least two arms, are substantially parallel to each other, and are substantially parallel to a horizontal direction that is substantially perpendicular to a vertical direction.

2. The parachute device according to claim 1, wherein the propulsion assembly includes a locking device that keeps the at least two arms in the rest condition and is releasable in response to operation of the second control device.

3. The parachute device according to claim 1 wherein the propulsion assembly further includes:
    a first coupling device that releasably couple the at least two arms to the frame; and
    a fourth control device operable to release the first coupling device to drop the at least two arms from the frame.

4. The parachute device according to claim 1, wherein the propulsion assembly includes a second coupling device that couples the at least two power units to the at least two arms and allows a configuration movement of the at least two power units with respect to the at least two arms; the axes of thrust being substantially parallel to the at least two arms in the rest condition.

5. The parachute device according to claim 4, wherein the at least two power units include:
    respective electric motors coupled to an end of the at least two arms and supplied by batteries that are carried by at least one of the frame, the bag, or the attachment device; and
    respective screw propellers, which include:
        respective hubs coaxial to the electric motors along the axes of thrust; and respective blades that are hinged to the hubs so as to be substantially parallel to the axes of thrust in the rest condition and being arranged in a radial pattern in the operating condition.

6. The parachute device according to claim 5, wherein the propulsion assembly further includes:
a third coupling device that releasably couple the batteries to at least one of the frame, the bag, or the attachment device; and
a fifth control device operable to release the third coupling device to drop the batteries.

7. The parachute device according to claim 1, wherein at least one of the first control device, the second control device, or the third control device is defined by a control unit arranged in a remote position and including a wireless signal transmission device to remotely execute the functions of at least one of the first control device, the second control device, or the third control device.

8. A parachute device according to claim 1, wherein, in the rest condition, the at least two power units are folded about second rotation axes with respect to the at least two arms and are arranged adjacent to the at least two arms.

9. The parachute device according to claim 8, wherein the second rotation axes are substantially perpendicular to the first rotation axes and are transverse to the at least two arms.

10. The parachute device according to claim 1, wherein the first rotation axes are substantially parallel to the horizontal direction.

* * * * *